June 8, 1943. W. R. FREEMAN 2,321,479
RATIO CHANGING BRAKE ACTUATING SYSTEM
Filed May 2, 1941
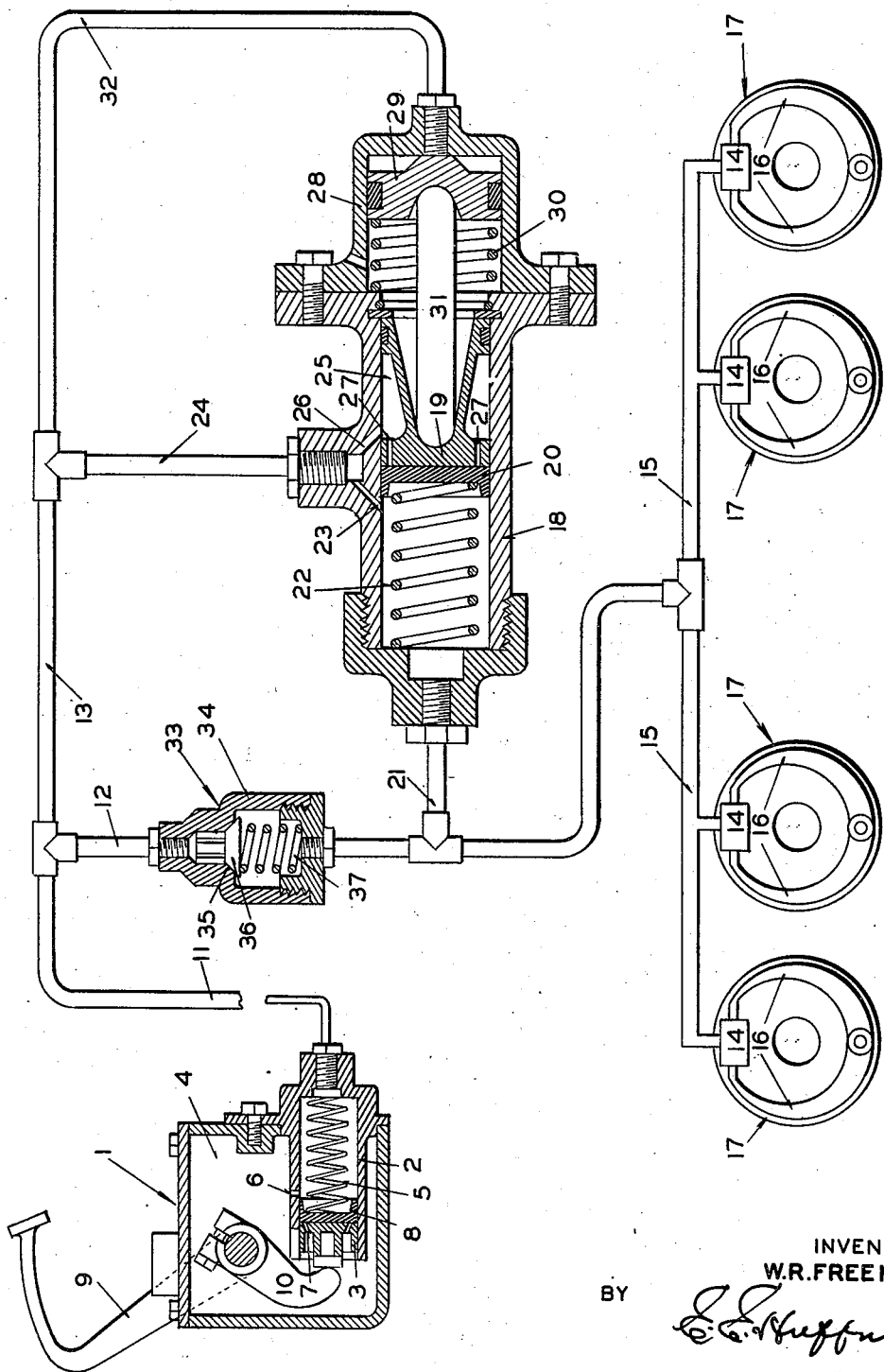
INVENTOR
W.R.FREEMAN
BY
ATTORNEY Patented June 8, 1943

2,321,479

UNITED STATES PATENT OFFICE 2,321,479

RATIO CHANGING BRAKE ACTUATING SYSTEM

Walter R. Freeman, Clayton, Mo., assignor to Wagner Electric Corporation, St. Louis, Mo., a corporation of Delaware Application May 2, 1941, Serial No. 391,452

10 Claims. (Cl. 188—152)

My invention relates to brake actuating means and more particularly to an improved hydraulic brake actuating system.

One of the objects of my invention is to produce an improved hydraulic brake actuating system in which is embodied means for changing the ratio between the hydraulic pressure created by a manually-controlled master cylinder and the pressure effective in actuating the brake after said master cylinder has developed a predetermined pressure.

Another and more specific object of my invention is to produce a hydraulically-actuated braking system in which standard parts can be so employed and readily associated with each other that a change in fluid pressure ratio can be obtained during brake application and without any noticeable effect on the foot of the operator during actuation of the pedal-operated master cylinder.

Still another object of my invention is to produce a hydraulic brake actuating system of the class described which is simple and efficient in operation, economical to manufacture and which is so arranged that free contraction and expansion of the liquid due to changes in temperature is permitted when the system is inoperative.

Other objects of my invention will become apparent from the following description taken in connection with the accompanying drawing in which the single figure is a schematic view of a hydraulic brake actuating system, the main parts thereof being shown in section.

Referring to the drawing in detail, numeral I indicates a master cylinder device comprising a cylinder 2, a piston 3, and a reservoir 4. The piston is normally held in retracted position by a spring 5 and when in this position it uncovers a porthole 6 whereby the cylinder will be in direct two-way communication with the reservoir in order to permit contraction and expansion of the fluid due to temperature changes. The piston 3 is provided with through passages 7 and has associated with its head surface a sealing cup 8. A pedal 9 actuates the piston by means of an arm 10. The master cylinder device just described and its operation are well known.

A conduit 11 leads from the forward end of cylinder 2 and connected thereto are branch conduits 12 and 13, the latter being connected to fluid motors 14 by other branch conduits 15, said fluid motors actuating the shoes 16 of brake assemblies 17.

Associated with the conduits 12 and 13 is a cylinder 18 in which is reciprocable a piston 19 provided with a sealing cup 20. The forward end of this cylinder is in direct communication with the branch conduit 12 by a conduit 21. The piston 19 is normally biased to a retracted position by a spring 22 and when in this position it uncovers a porthole 23 which is in direct communication with the branch conduit 13, previously referred to, by a conduit 24. The piston 19 is of the spool type providing an annular chamber 25 and this chamber is in constant communication with conduit 24 by way of a passage 26 to thus maintain a body of fluid behind the head of the piston. By means of this body of fluid sub-atmospheric pressure will be prevented from developing in the cylinder ahead of the piston during retracting of said piston as fluid is permitted to by-pass the packing cup 20. Passages 27 are provided in the head of the piston to facilitate this by-passing.

Attached to the rear end of cylinder 18 is a second cylinder 28 of larger diameter and within this cylinder is a piston 29 held in retracted position by a spring 30. The piston 29 is connected to actuate the piston 19 by a rod 31 and a conduit 32 places cylinder 28 in direct communication with the branch conduit 13.

Interposed in the branch conduit 12 at a point between its juncture with conduit 11 and the juncture of conduit 21 therewith, is a check valve 33. This valve comprises a casing 34 provided with a valve seat 35 with which cooperates a valve element 36 normally biased to a seated position by a light spring 37. The check valve permits fluid to flow through the branch conduit 12 from the master cylinder but prevents any reverse flow.

Referring now to the operation of the braking system just described, the parts will be in the positions shown when the system is inoperative and said system including reservoir 4 is filled with a suitable liquid. Under these conditions contraction and expansion of the fluid due to temperature changes is permitted since reservoir 4 is in communication with all the conduits, cylinders and brake actuating fluid motors because portholes 6 and 23 will be uncovered.

When it is desired to apply the brakes, pedal 9 is depressed. This will result in porthole 6 being closed and the fluid ahead of the piston 3 placed under pressure. The fluid under pressure will be free to flow to the fluid motors 14 by way of conduit 12 and through check valve 33 or by way of conduits 13 and 24, porthole 23, cylinder 18, and conduit 21. If piston 3 is moved slowly, the flow may be through the porthole 23. However, if there is a rapid movement of piston 3, the major portion of the flow will be through the check valve since it will permit establishment of a larger passage. The porthole 23 must necessarily be kept small to prevent cutting of cup 20 as it passes over the hole. Therefore, if the conduit 12 and check valve 33 were not employed, the system would not function as efficiently as desired. If valve 33 were eliminated and piston 3 moved rapidly, the small porthole 23 would so restrict flow of fluid that a sufficient pressure would be built up to move pistons 29 and 19 and cut off the porthole before the desired amount of fluid was transmitted to the fluid motors to take up the slack and apply the brakes. With valve 33 fluid can be placed in the fluid motors very rapidly by the master cylinder. Fluid under pressure developed by the master cylinder also flows to cylinder 28 and is effective on piston 29 since said cylinder is in direct communication with the master cylinder by conduit 32. The fluid pressure developed by the master cylinder will thus cause operation of the fluid motors of the brake assemblies and apply the brakes. Piston 29 will not be operated during this initial operation of the fluid motors due to the strength of spring 30. When the pressure developed by the master cylinder reaches such a value that spring 30 will be compressed, piston 29 will move to the left, as viewed in the figure, and cause a like movement of piston 19. When piston 19 has moved sufficiently to cut off porthole 23, it will begin to develop pressure and this pressure, which is greater than the pressure being developed by the master cylinder due to the master cylinder piston being of a larger diameter than piston 19, will be effective only in the fluid motor 14 as the check valve 36 will be held closed.

It is thus seen that when passage 23 is cut off by movement of piston 19, there will be a change in ratio between the pressure being developed by the main master cylinder and the pressure effective in the fluid motors 14 for actuating the brakes. Prior to this change, the fluid pressures were of the same value since the main master cylinder was in direct communication with the fluid motors 14. By means of the change in ratio the brakes can be applied with a greater force by the same manual effort than would be possible if the master cylinder were directly connected with the fluid motors 14 for two-way communication at all times.

In practice it has been found desirable to have piston 3 of the main master cylinder and piston 29 substantially the same size. In the drawing the main master cylinder and its piston 3 are shown on a smaller scale than cylinders 18 and 28 and their pistons 19 and 29. Preferably, the master cylinder piston for a particular brake system is larger than that used wherein no change in ratio is provided.

The braking system results in the brakes being initially applied by a fairly large displacement of fluid due to the fact that the main master cylinder piston is quite large. After the brakes have become applied and all slack has been taken up, the brakes will be applied additionally by the piston of smaller diameter. Thus it is seen that there is a mechanical advantage obtained which is very desirable.

When it is desired to release the brakes, the pedal is released, thus relieving the pressure behind piston 29. The springs 30 and 20 will now return the pistons 29 and 19 to their inoperative positions and fluid from the fluid motors will be returned by the action of the usual brake shoe return springs. The fluid motors 14 will now again be in communication with reservoir 4 of the master cylinder. Thus if there is any excess fluid in the system, it can return to the reservoir. If, during the return movement of piston 19, there should be sub-atmospheric pressure developed ahead of this piston, fluid will by-pass piston 19 from chamber 25 by way of passages 26 and around the packing cup 20. This by-passed fluid will prevent air from being drawn into the system. Also, if during the release of the brakes there should be a tendency for sub-atmospheric pressure to develop ahead of the master cylinder piston 3, fluid will by-pass this piston by way of passages 7 and around packing cup 8.

It is to be particularly noted in the braking system just described that standard parts only are employed, thereby permitting the system to be manufactured at a very low cost. Also, the arrangement is such that there will be no noticeable effect on the operator's foot when the change in ratio takes place. At the time of the change-over, the fluid pressure in the entire system is equal and corresponds to that being developed by the master cylinder. When piston 19 is moved to cut off porthole 23 and cause a higher fluid pressure to be effective in the fluid motors 14 than that being developed by the master cylinder, there will be a change in pressure until the new ratios are established. This change may be somewhat gradual if the piston 3 is being moved slowly or it may be quite rapid if said piston is being moved rapidly. The spring 30 also is effective in making a smooth change as it must be compressed.

Since the change-over unit comprising the cylinders 18 and 28 is a separate unit from the master cylinder, it may be positioned at any place desired. The same is true of the check valve 33. These separate units thus facilitate the installation of the braking system as no one place need be found where all of the units, including the master cylinder, will fit.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus, a brake, a fluid motor for actuating the brake, a manually-controlled master cylinder comprising a cylinder, a piston, a reservoir, and means permitting the reservoir to have two-way communication with the cylinder ahead of the piston only when the piston is in retracted position, a second cylinder, a piston therein, conduit means for connecting the cylinder of the master cylinder and the second cylinder to the fluid motor, means for directly moving the piston of the second cylinder solely by fluid pressure being developed by continued movement of the piston of the master cylinder, said last named means embodying means for causing the pressure developed by the piston of the second cylinder to be greater than the pressure developed by the master cylinder, means for causing the fluid pressure developed by the piston in the second cylinder to be effective only in actuating the fluid motor, and means for placing the second cylinder and the fluid motor in two-way communication with the cylinder of the master cylinder and its reservoir only when the second piston and the piston of the master cylinder are in retracted position.

2. In braking apparatus, a brake, a fluid motor for catuating the brake, a manually-controlled master cylinder comprising a cylinder, a piston, a reservoir and means permitting the reservoir to have two-way communication with the cylinder ahead of the piston only when the piston is in retracted position, a second cylinder, a piston therein, said last named piston being of smaller diameter than the master cylinder piston, conduit means for connecting the cylinder of the master cylinder and the second cylinder to the fluid motor, a third cylinder, a piston therein of larger diameter than the piston of the second cylinder, a connection between the two last named pistons, conduit means for placing the third cylinder in communication with the cylinder of the master cylinder to thus cause actuation of the piston in the second cylinder by fluid pressure developed by the master cylinder, means for causing the fluid pressure developed by the piston in the second cylinder to be effective only in actuating the fluid motor, and means for placing the second cylinder and the fluid motor in two-way communication with the cylinder of the master cylinder and its reservoir only when the second piston and the piston of the master cylinder are in retracted position.

3. In braking apparatus, a brake, a fluid motor for actuating the brake, a master cylinder device, conduit means for connecting the master cylinder device to the fluid motor, means operable when a predetermined pressure is developed by the master cylinder for trapping fluid in the fluid motor and for causing said master cylinder by continued operation to directly apply solely by means of the fluid pressure being developel a greater pressure to the trapped fluid than that being developed by the master cylinder, said means comprising a normally closed check valve in said conduit means, a by-pass conduit around said check valve, and valve means for closing said by-pass conduit only after the fluid pressure developed by the master cylinder reaches the predetermined value.

4. In braking apparatus, a brake, a fluid motor for actuating the brake, a master cylinder device, conduit means for connecting the master cylinder device to the fluid motor, means operable when a predetermined pressure is developed by the master cylinder for trapping fluid in the fluid motor and for causing said master cylinder to apply a greater pressure to the trapped fluid than that being developed by the master cylinder, said means comprising two cylinders of different size, the larger of which is connected to the master cylinder and the smaller of which is connected to the fluid motor, connected pistons in said cylinders, spring means preventing movement of the pistons until a predetermined pressure is developed in the master cylinder, a normally closed check valve in said conduit means and preventing fluid from flowing through said conduit means from the fluid motor to the master cylinder at all times, a by-pass conduit around said check valve, and valve means controlled by the movement of said pistons for closing said by-pass.

5. In braking apparatus, a brake, a fluid motor for actuating the brake, a manually-controlled master cylinder device, a separate cylinder, a piston therein, conduit means for connecting the master cylinder device and the cylinder to the fluid motor, check valve means associated with the conduit means for preventing at all times return flow of fluid under pressure through the conduit means from the fluid motor to the master cylinder device, by-pass means around the check valve for permitting two-way communication between the master cylinder and fluid motor, said by-passing means comprising valve means controlled by the movement of the piston so as to permit said two-way communication only when the piston is in inoperative position, and means movable solely by the increasing fluid pressure developed by the continued operation of the master cylinder for directly actuating the piston and causing fluid pressure developed thereby to act only on the fluid motor.

6. In braking apparatus, a brake, a fluid motor for actuating the brake, a manually-controlled master cylinder device, a separate cylinder, a piston therein, conduit means for connecting the master cylinder device and the cylinder to the fluid motor, normally closed check valve means associated wtih the conduit means for preventing at all times return flow of fluid under pressure through the conduit means from the fluid motor to the master cylinder device, by-pass means around the check valve for permitting two-way communication between the master cylinder and fluid motor, said by-passing means comprising valve means controlled by the movement of the piston so as to permit said two-way communication only when the piston is in inoperative position, a second cylinder of larger diameter than the first cylinder, a piston therein, a connection between the last named piston and first named piston, and conduit means for placing the second cylinder in communication with the master cylinder.

7. In braking apparatus, a brake, a fluid motor for actuating the brake, a manually-controlled master cylinder device, a cylinder, a piston therein, conduit means for connecting the master cylinder device and the cylinder to the fluid motor, check valve means associated with the conduit means for preventing at all times return flow of fluid under pressure through the conduit means from the fluid motor to the master cylinder device, by-pass means around the check valve for permitting two-way communication between the master cylinder and fluid motor and comprising a porthole uncovered by the piston when in inoperative position so as to permit said two-way communication only when the piston is in said position, and means movable solely by the increasing fluid pressure developed by the continued operation of the master cylinder for directly actuating the piston and causing fluid pressure developed thereby to act only on the fluid motor.

8. In braking apparatus, a brake, a fluid motor for actuating the brake, a pedal-operated master cylinder, conduit means connecting the master cylinder to the fluid motor, a check valve for preventing return flow of fluid through said conduit means at all times, a cylinder connected to the fluid motor, a piston therein, said cylinder being provided with a porthole which is uncovered by the piston when in retracted position, conduit means connecting the porthole with the master cylinder, a second cylinder of larger diameter than the first cylinder, a piston therein, conduit means for placing the second cylinder in communication with the master cylinder, and spring means for biasing the two pistons to inoperative position.

9. In braking apparatus, a brake, a fluid motor for applying the brake, a master cylinder device comprising a cylinder and a piston, a second cylinder of smaller diameter than the cylinder of the master cylinder device, a piston in said second cylinder, said second cylinder being provided with a porthole which is uncovered by the piston therein when in retracted position, conduit means connecting the cylinder of the master cylinder of the master cylinder device and the second cylinder to the fluid motor, a one-way valve in said conduit means for preventing at all times fluid under pressure from flowing through the conduit means from the second cylinder and fluid motor to the cylinder of the master cylinder device, conduit means connecting the porthole to the cylinder of the master cylinder and permitting two-way communication between the master cylinder device and the fluid motor when the piston in the second cylinder is in retracted position, and means for moving the piston of the second cylinder solely and directly by increased fluid pressure developed by the master cylinder device.

10. In braking apparatus, a brake, a fluid motor for applying the brake, a master cylinder device comprising a cylinder and a piston, a second cylinder of smaller diameter than the cylinder of the master cylinder device, a piston in said second cylinder, said second cylinder being provided with a porthole which is uncovered by the piston therein when in retracted position, conduit means connecting the cylinder of the master cylinder device and the second cylinder to the fluid motor, a one-way valve in said conduit means for preventing at all times fluid under pressure from flowing through the conduit means from the second cylinder and fluid motor to the cylinder of the master cylinder device, conduit means connecting the porthole to the cylinder of the master cylinder and permitting two-way communication between the master cylinder device and the fluid motor when the piston in the second cylinder is in retracted position, and means for moving the piston of the second cylinder only when the fluid pressure developed by the master cylinder device is a predetermined value, said last named means comprising a third cylinder, a piston therein and connected to the piston in the second cylinder, means for placing the third cylinder in communication with the master cylinder, and a spring acting to oppose movement of the piston in the third cylinder by pressure developed by the master cylinder.

WALTER R. FREEMAN.